United States Patent [19]
Kiffe et al.

[11] 3,816,929
[45] June 18, 1974

[54] MEASURING INSTRUMENT

[75] Inventors: Horst-Gregor Kiffe; Paul Scheller, both of Villingen; Wolfgang Hafner, Unterkirnach, all of Germany

[73] Assignee: Friedrich Rambold KG, Villengen, Germany

[22] Filed: Nov. 15, 1971

[21] Appl. No.: 198,934

[52] U.S. Cl.............................................. 33/172 E
[51] Int. Cl. ............................................ G01b 3/22
[58] Field of Search....... 33/172 E; 200/56 R, 56 A, 200/153 L, 153 LA

[56] References Cited
FOREIGN PATENTS OR APPLICATIONS
668,679  3/1952  Great Britain .................... 33/172 E
1,079,335  4/1960  Germany........................... 33/172 E

*Primary Examiner*—William D. Martin, Jr.
*Assistant Examiner*—Charles E. Phillips
*Attorney, Agent, or Firm*—Michael S. Striker

[57] ABSTRACT

A measuring instrument has a pair of spaced electrical contacts mounted on a housing and a contact lever, pivotally mounted on the housing, which carries a movable contact which moves between the electrical contacts. A feeler gauge, forming part of a dial gauge, is slidable along its axis in relation to the housing. A cam, pivotable on said housing in a plane parallel to the plane in which the contact lever pivots, has a straight edge which serves the function of a cam surface. The feeler gauge is provided with a pin which engages the straight edge and, under the influence of a spring, comprises a cam follower. A spring couples the cam and the contact lever for sharing movements in one pivoting direction and a pin mounted on the cam which engages the contact lever, causes the latter to share the movement of the cam in pivoting movements in the other direction. The slope of the straight edge relative to the axis of the feeler gauge is selected to translate a large movement of the feeler gauge into a smaller movement of the movable contact.

11 Claims, 3 Drawing Figures

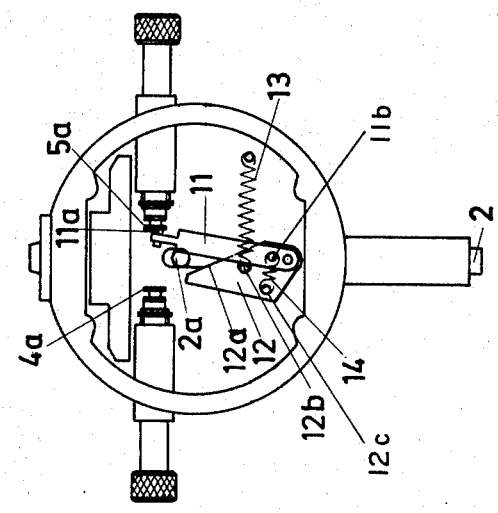
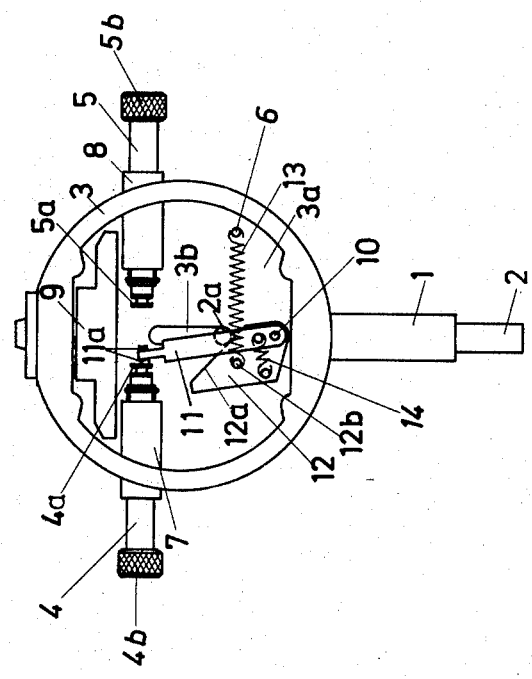
Fig.2
Fig.1

MEASURING INSTRUMENT

BACKGROUND OF THE INVENTION

The present invention relates to distance measuring gauges, and in particular to gauges which include a contact arrangement for providing an electrical signal whenever the movable feeler gauge reaches predetermined positions or selected end limits.

Measuring dials are known in the art which include a pair of electrical contacts which can provide a signal that the feeler gauge has reached a predetermined time limit. According to the prior art gauges, the axially movable feeler gauge operates on a pivoted control lever against the action of a biasing spring. The movement of the feeler gauge causes rotation of the control lever about the pivot point. A right angle-shaped contact lever is pivoted at its apex about an axis which is perpendicular to the axis about which the control lever pivots. One arm of the contact lever engages and abuts the other end of the control lever from the one upon which the feeler gauge acts. Biasing means connected to the contact lever urges said lever to pivot in a direction to maintain abutting engagement with the control lever. The other arm of the contact lever, the free arm, is provided with a movable electrical contact carried thereby which is adapted to make contact with the two stationary contacts. However, according to this prior art arrangement, small movements of the feeler gauge have resulted in large movements of the movable contact. Although the stationary contacts can usually be adjusted to separate the same, the prior art arrangements have not made it possible to utilize the entire measuring range of the feeler gauge. Since the electrical contact apparatus is very often used in conjunction with the calibrated gauge dial, the entire scale or measuring range could not be utilized when electrical signals were desired upon the feeler gauge reaching predetermined positions. Because of the limiting range that the use of the electrical contacts have had on the usable measuring range on the feeler gauge dial, only small portions of the range could be used, this situation usually being aggravated when the electrical contacts are brought closer together for electrically indicating smaller dimensions between a reference surface and the surface of interest.

SUMMARY OF THE INVENTION

Accordingly, it is an object of the present invention to provide a measuring instrument which does not have the disadvantages of the prior art.

It is another object of the present invention to provide a measuring instrument which is simple in construction and economical in its manufacture which will provide electrical indications when a feeler gauge reaches predetermined positions or end limits.

It is still another object of the present invention to provide a measuring instrument which can be used in conjunction with a dial gauge and which permits the use of the entire range of the dial gauge while being capable of providing electrical signals whenever the feeler gauge moves between any two positions within said range.

It is a further object of the present invention to provide a measuring instrument for providing electrical signals when a feeler gauge has moved to predetermined boundary limits and which can be connected to or disconnected from a feeler dial gauge.

It is still a further object of the present invention to provide a measuring instrument which has a pair of spaced stationary contacts and a movable contact therebetween and a cam arrangement connected to a feeler gauge and the movable contact, wherein the dial gauge covers the entire measuring range for movement of the feeler gauge between its maximum limits.

According to the present invention, in a measuring instrument, a combination comprises support means. A pair of spaced contacts are mounted on said support means and a movable contact is mounted on said support means and movable between said spaced contacts. Elongated feeler means are slidably mounted on said support means for movement between first and second positions. Translating means are provided between said feeler means and said movable contact for translating a large movement of said feeler means to a smaller movement of said movable contact.

According to a presently preferred embodiment, a support means comprises a housing and a contact lever is provided which is mounted at one end thereof, said movable contact being mounted on the other end. A feeler means is movable along its axis, and a translating means comprises a cam having a cam surface. Said feeler means includes a cam follower which engages said cam surface. Biasing means are provided for maintaining said cam follower in engagement with said cam surface. The cam and the contact lever are mounted in parallel planes, said feeler means axis being parallel to said plane, and the cam is positioned between the feeler means and the contact lever.

The novel features which are considered as characteristic for the invention are set forth in particular in the appended claims. The invention itself, however, both as to its construction, and its method of operation, together with additional objects and advantages thereof, will be best understood from the following description of specific embodiments when read in connection with the accompanying drawing.

BRIEF DESCRIPTION OF THE DRAWINGS

FIG. 1 is a front elevational view of a measuring instrument in accordance with the present invention, showing the feeler gauge in a normally extended position and the reference surface;

FIG. 2 is a similar view as in FIG. 1, showing the feeler gauge in a retracted position during the measurement of a workpiece positioned on the reference surface.

DESCRIPTION OF THE PREFERRED EMBODIMENTS

Figure 3:
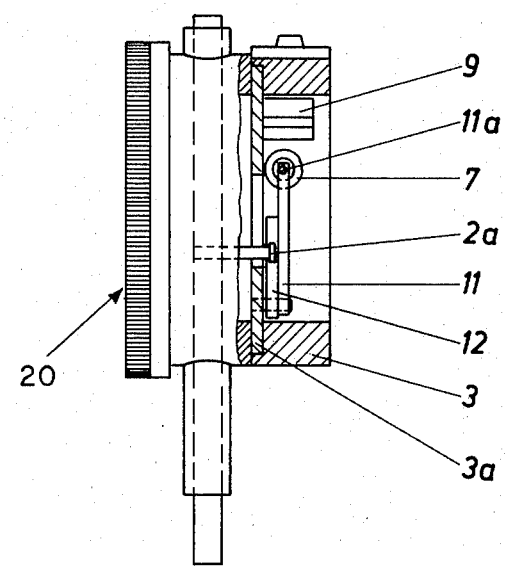
FIG. 3 side elevational view, partly in cross-section, showing the measuring instrument of FIG. 1 connected to a dial gauge.

Referring to the drawings, and looking first at FIG. 1, a measuring instrument is illustrated which includes a feeler gauge shaft 1 and a feeler gauge 2 which is axially slidable thereon. A spring (not shown) urges the feeler gauge 2 to return to the extended position shown in FIG. 1. The feeler gauge shaft 1 and the feeler gauge 2 are constructed in a manner well known in the art. Accordingly, the lower end, or extended measuring end, is provided with a smooth surface which abuts against a workpiece during a measurement. The other end of the feeler gauge 2 is provided with a pin 2a which shares its axial movements. The pin 2a extends in a direction substantially perpendicular to the direction of the axis of the feeler gauge. The function of the pin 2a will be described hereafter.

The measuring instrument is embodied in a housing 3, which is shown to be in the shape of a shallow cylindrical enclosure. The housing 3 can be provided with a wall 3a on one side of the housing 3, but such a wall can comprise the rear wall of a measuring dial as to be described. The wall 3a is provided with a elongated slot 3b, which slot extends in the axial direction of the feeler gauge 2. The length of the slot 3b is selected to correspond to the amount of movement which can be taken by the feeler gauge 2, so that the pin 2a can move from the lower to the upper end of the slot 3b without hindering the movement of the feeler gauge 2.

Threaded plugs 4 and 5 are mounted in and meshed with threaded sleeves 7 and 8. Threaded plugs 4 and 5 have electrical contacts 4a and 5a at one end respectively, and have knurled ends 4b and 5b at the other ends thereof. By rotating the knurled ends 4b, 5b, either one or both of the threaded plugs 4 and 5 can be advanced along the axial direction of the threaded plugs. The direction of advancement of the threaded plugs 4, 5 is, in the presently preferred embodiment, in a direction normal to the direction of movement of the feeler gauge 2. Either one or both of the screw plugs 4, 5 can be moved in order to symmetrically or non-symmetrically locate the contacts 4a and 5a with respect to the slot 3b.

A bridge 9, made from insulating material, spans over the contacts 4a and 5a, covering said contacts in all their contemplated positions. Electrical conductors (not shown) are brought into the housing 3, but insulated therefrom, and, via the bridge 9, are supplied for connection to the contacts 4a and 5a. The leads, in a well-known way, are connected to the contacts 4a and 5a in a manner which permits said connection to continue for all contemplated positions of the contacts 4a and 5a.

Mounted on the housing, in particular on the wall 3a, is a pin 10 which extends from said wall and forms a pivot point for a contact lever 11 and a control lever or cam 12. It is not necessary, for the present invention, that the contact lever 11 and the cam 12 be pivotally mounted about the same axis. However, according to the presently preferred embodiment, such an arrangement offers extreme simplicity in construction which permits economical production.

The contact lever 11 is shown to be elongated lever pivotally mounted at one end on the pin 10. At the other end of the contact lever 11 are a pair of contacts 11a which are designated as movable contacts. Contacts 4a and 5a can be referred to as stationary contacts since, although they are adjustable between measurements, they are generally stationary while the measurements are being made. The movable contacts 11a are thereby arranged for movement along a small arc between the contacts 4a and 5a. The shape and dimensions of the contacts 4a and 5a and 11a should be selected so that the stationary and the movable contacts continue to engage for all contemplated positions of the stationary contacts. Being mounted on the pin 10, which is perpendicular to the wall 3a, the contact lever pivots in a plane which is parallel to the plane of the wall 3a Similarly, the cam 12 is pivotally mounted on the pin 10 for movement in a plane parallel to the plane of the wall 3. The cam 12 is positioned between the feeler gauge 2 and the contact lever 11. The cam 12 is provided with a cam surface or straight edge 12a which cooperates with the pin 2a to form a cam surface and cam follower arrangement. The feeler gauge 2, being urged by a spring (not shown) to move in a downward direction to extend the feeler gauge 2, causes in the pin 2a in being urged to remain engaged with the straight edge 12a.

Mounted on the cam 12 is a pin 12b and on the housing 3 is mounted a pin 6, these two pins being used as anchoring means for a tension spring 13. The tension spring 13 urges the cam 12 to rotate in a clockwise direction about the pin 10. Such clockwise rotation of the cam 12, however, is opposed by the action of biased pin 2a, the pin 2a, as a result of the slanted straight edge 12a, urges the cam 12 in a counterclockwise direction. The tensions of the respective springs are selected so that when no external forces are applied on the feeler gauge, as when not making a measurement, the biasing force on the feeler gauge 2a prevails and the cam 3 pivots in a counterclockwise direction to permit the feeler gauge 2 to fully extend as shown in FIG. 1.

The contact lever 11 is provided with a pin 11b and the cam 12 is provided with a second pin 12c, these two respective pins acting as anchoring means for a tension spring 14. The effect of the spring 14 is to urge the contact lever to rotate in a counterclockwise direction when the cam 12 likewise rotates in such direction. However, depending on the position of the contact 4a, the contact lever 11 may not always be able to follow or share all the counterclockwise movements of the cam 12. When the cam 12 is pivoting in a counterclockwise direction, such as when under the influence of the downward movement of the pin 2a, the spring 14 will urge the contact lever to follow its movement. However, as soon as contact 4a and contact 11a have engaged, the contact lever 11 can no longer pivot in a counterclockwise direction. At such time, the spring 14 stretches in response to continued counterclockwise movement of the cam 12 to thereby increase the tension on the contact lever 11. Such increased tension is useful in insuring that good electrical contact is made between the contacts 4a and 11a. Spring 14 can be selected so that, in combination with the spring 13, the forces tending to cause the cam 12 to pivot in a clockwise direction just about equals the force offered by the pin 2a to urge said cam 12 to rotate in a counterclockwise direction. In such a case, as soon as the contacts 4a and 11a have engaged, the cam 12 ceases to pivot in a counterclockwise direction. The biasing forces exerted on the feeler gauge 2 having been effectively cancelled, the feeler gauge 2 does not extend the full distance possible as shown in FIG. 2, but extends to an intermediate position. On the other hand, the spring 14 can be selected so that the biasing spring on the feeler gauge 2 can still overcome the combined action of the springs 13 and 14. In such a case, the pin 2a will continue to move in a downward direction and continue to cause the counterclockwise pivoting movement of the cam 12 until the pin 2a has reached the lower end of the slot 3b. However, in the presently preferred embodiment, the feeler gauge 2 always returns to its extended position to thereby cause stretching of both springs 13 and 14.

Referring to FIGS. 1 and 2, the operation of the measuring instrument will now be described. The housing 3 is fixed in relation to a reference surface in any well-known manner. The contacts 4a and 5a are positioned, by the rotation of the threaded plugs 4 and 5, to correspond to predetermined end or boundary limits for the feeler gauge 2. The use of boundary limits in this manner, is particularly useful during mass production of machined parts or other items where the next step of the manufacturing process is dependent on the dimension of particular workpiece. The spacing of the support means or housing 3 from the reference surface is normally selected so that the feeler gauge 2 just makes contact with the reference surface when said feeler gauge is in its fully extended position. This, however, is not always necessary, especially where measuring dials can be rotated or set to zero for any particular position of the feeler gauge 2 and when the positions of contacts 4a and 5a are adjustable.

In FIG. 2, a workpiece is positioned for measurement. The workpiece urges the feeler gauge 2 in an upward direction. Accordingly, the pin 2a likewise moves in an upward direction along the slot 3b. While the pin 2a is moving in an upward direction, first both springs 13 and 14 and then primarily spring 13 urge the cam 12 to pivot in a clockwise direction. As the cam 12 pivots in a clockwise direction, the extent of such movement is controlled by the straight edge 12a. In particular, in the present preferred embodiment, the straight edge 12a is selected so that a relatively large axial movement of the feeler gauge 2 results in a substantially smaller movement of the cam 12 in a direction transverse to the axis of the feeler gauge 2.

Once the cam 12 commences to pivot in a clockwise direction, primarily under the influence of the tension spring 13 as described above, the pin 12b, which extends sufficiently, engages the contact lever 11 and urges or carries the contact lever 11 towards the contact 5b or in clockwise direction. Once the contact 11a has engaged the contact 5a, the contact lever 11 can no longer rotate in a clockwise direction. At such time, the cam 12 can likewise no longer rotate since it is restricted from doing so by the pin 12b which abuts against the now fixed contact lever 11. However, should the feeler gauge 2 be required to move in a still further retracted position, it may continue to do so until it reaches the upper end of the slot 3b. Such further or additional movement of the feeler gauge 2 does not effect the cam 12 or the contact lever 11 after contact has been made with contact 5a.

the cam surface 12a need not necessarily be a straight edge as illustrated in the Figures. Such a straight edge does provide for linearity in translating the motion of the feeler gauge 2 to the movements of the movable contacts 11a. However, where this may be desirable, the cam surface 12a can be of any appropriate shape such as circular or parabolic. However, according to a presently preferred embodiment, the cam surface 12a is selected according to two criteria. The first criterion, as described above, ensures that a relatively large movement of the feeler gauge 2 is translated into a relatively small movement of the contacts 11a. The second criterion is that, in the positions of the contacts 4a and 5a providing maximum spacing therebetween, the contacts 11a should be capable of engaging said spaced contacts at the extreme limits or boundaries between which the feeler gauge 2 can move. This insures that the device is useful over the entire measuring range of the dial gauge.

FIG. 3 shows the instrument described thus far used in conjunction with a dial gauge 20. When used in this way, the instrument illustrated in FIGS. 1 and 2 is an attachment to the dial gauge which can be connected or removed at will. The dial gauge 20 can be of conventional construction in which case it may have to be modified, for example by adding a slot 3b in rear wall 3a and connecting a pin 2a to feeler gauge 2, to properly couple to the instrument shown in FIGS. 1 and 2. Thus, dial gauge 20 incorporates the feeler gauge shaft 1 and the feeler gauge 2. The dial gauge 20 has a rear wall 3a which is slotted as shown in FIG. 1. The instrument can be connected to the dial gauge 20 with several screws (not shown) or in any other known or conventional way. The pin 2a extends through the rear wall 3a sufficiently to engage the cam 12. The pin 2a is shown connected to the feeler gauge 2, the manner in which the connection is made not being critical. For example, the feeler gauge 2 and the pin 2a could have mating threaded portion which are meshed to effect a connection. A spring (not shown) is provided in the dial gauge 20 to urge the feeler gauge to its fully outwardly extended position as discussed above. Also, in a conventional way, the feeler gauge is connected to a pointer (not shown) for indicating the measured length on a marked scale (not shown), such a marked scale normally being provided on the side of the dial gauge opposite to the rear wall 3a.

The electrical contacts 4a, 5a and 11a can be treated in ways known in the art to protect the same from electrical sparks and corrosion. In the presently preferred embodiment, these contacts are gold plated.

It will be understood that each of the elements described above, or two or more together, may also find a useful application in other types of measuring instruments differing from the types described above.

While the invention has been illustrated and described as embodied in a dial gauge having electrical limit contacts, it is not intended to be limited to the details shown, since various modifications and structural changes may be made without departing in any way from the spirit of the present invention.

Without further analysis the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a measuring instrument, a combination comprising support means, said support means including a housing; a dial gauge mounted on said support means; a pair of spaced contacts mounted on said support means; a contact lever having two ends and being pivotally mounted on said support means at one end of said ends for pivoting movement in a first plane; a movable contact movable between said spaced contacts and being mounted at the other of said ends of said contact lever; elongated feeler means actuated by said dial gauge and slidably mounted on said support means for movement between first and second positions, said feeler means having an axis parallel to said first plane and being movable along said axis, and said feeler means including a cam follower; translating means between said feeler means and said movable contact for translating a large movement of said feeler means into a smaller movement of said movable contact, said translating means comprising a cam having a cam surface which engages said cam follower, said cam being pivotally mounted on said housing for pivoting movement in a second plane parallel to said first plane and said axis, and said cam being positioned between said feeler means and said contact lever; said first biasing means for maintaining said cam follower in engagement with said cam surface.

2. In a measuring instrument as defined in claim 1, wherein said dial gauge has a rear wall formed with a slot, wherein said housing abuts against said rear wall and is connected to said dial gauge, and wherein said feeler means form part of said dial gauge and said cam follower comprises a pin extending through said slot for engagement with said cam surface.

3. In a measuring instrument as defined in claim 1, wherein said cam follower comprises a pin connected to said feeler means and extending in a direction substantially normal to the axis of said feeler means and in the direction of said cam for engagement therewith.

4. In a measuring instrument as defined in claim 1, further including second biasing means between said cam and said contact lever to transmit the movement of said cam to said contact lever in a first pivotal direction.

5. In a measuring instrument as defined in claim 4, further comprising a carrying pin mounted on said cam and extending in the direction of said contact lever for engagement with the latter to transmit the movement of said cam to said contact lever in a second pivotal direction opposite to said first pivotal direction.

6. In a measuring instrument as defined in claim 1, wherein both said cam and said contact lever are pivotal about the same axis.

7. In a measuring instrument as defined in claim 1, wherein said first biasing means comprises a tension spring connected at one end to said support means and at the other end to said cam.

8. In a measuring instrument as defined in claim 1, wherein said cam surface comprises a straight edge on said cam which is oriented at an angle to said feeler means axis.

9. In a measuring instrument as defined in claim 1, wherein said spaced contacts include adjusting means for adjusting said contacts for movement relative to each to thereby change the spacing therebetween.

10. In a measuring instrument as defined in claim 9, wherein said adjusting means comprises meshed screw threaded portions on said contacts and on said support means.

11. In a measuring instrument as defined in claim 1, wherein said spaced contacts and said movable contact are gold plated.

* * * * *